US012700914B2

(12) United States Patent
Park et al.

(10) Patent No.: US 12,700,914 B2
(45) Date of Patent: Aug. 4, 2026

(54) AERIAL REPEATER POSITION DETERMINATION APPARATUS, AERIAL REPEATER POSITION DETERMINATION METHOD, AND RECORDING MEDIUM STORING INSTRUCTIONS TO PERFORM AERIAL REPEATER POSITION DETERMINATION METHOD

(71) Applicant: AGENCY FOR DEFENSE DEVELOPMENT, Daejeon (KR)

(72) Inventors: Jae Don Park, Daejeon (KR); Jong Sung Park, Daejeon (KR); Yong Woo Park, Daejeon (KR); Sungho Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 709 days.

(21) Appl. No.: 18/157,396

(22) Filed: Jan. 20, 2023

(65) Prior Publication Data

US 2023/0239035 A1     Jul. 27, 2023

(30) Foreign Application Priority Data

Jan. 24, 2022     (KR) ........................ 10-2022-0010043

(51) Int. Cl.
*H04B 7/185*     (2006.01)
*H04B 7/06*     (2006.01)

(52) U.S. Cl.
CPC ....... *H04B 7/18502* (2013.01); *H04B 7/0632* (2013.01)

(58) Field of Classification Search
CPC .............. H04W 36/033; H04B 7/0632; H04B 7/18502; G01S 7/006; G01S 13/003
(Continued)

(56) References Cited

U.S. PATENT DOCUMENTS

| 12,130,638 | B2 * | 10/2024 | Lekutai | .................. | G05D 1/104 |
| 2010/0234071 | A1 * | 9/2010 | Shabtay | ................. | H04B 7/155 |
| | | | | | 455/562.1 |

(Continued)

FOREIGN PATENT DOCUMENTS

| CN | 1431465 A | * | 7/2003 |
| CN | 102435194 A | * | 5/2012 |

(Continued)

OTHER PUBLICATIONS

Office Action dated Jun. 27, 2023 in Korean Application No. 10-2022-0010043 and English translation.

*Primary Examiner* — David Q Nguyen
(74) *Attorney, Agent, or Firm* — Knobbe, Martens, Olson & Bear, LLP

(57)     ABSTRACT

An aerial repeater position determination apparatus is proposed. The apparatus may include a transceiver configured to acquire a height of an aerial repeater, a position of a source node, and a position of a mobile communication base station. The apparatus may also include an initial position determination processor configured to determine an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater.

17 Claims, 7 Drawing Sheets

100

110
TRANSCEIVER UNIT

120
INITIAL POSITION DETERMINATION UNIT

130
LoS DETERMINATION UNIT

140
FINAL POSITION DETERMINATION UNIT

(58) Field of Classification Search
USPC ............................... 455/431, 562.1; 714/752
See application file for complete search history.

(56) References Cited

U.S. PATENT DOCUMENTS

| | | | | |
|---|---|---|---|---|
| 2011/0296271 A1* | 12/2011 | Tan | ....................... | H04L 1/0618 |
| | | | | 714/752 |
| 2014/0266857 A1* | 9/2014 | Mayer | ..................... | G01S 7/006 |
| | | | | 342/60 |
| 2024/0031890 A1* | 1/2024 | Cheng | ................. | H04W 36/033 |
| 2024/0155470 A1* | 5/2024 | Orsino | ................. | H04W 48/12 |

FOREIGN PATENT DOCUMENTS

| | | | | | |
|---|---|---|---|---|---|
| CN | 108156613 A | * | 6/2018 | ............ | H04W 16/26 |
| EP | 4297288 A1 | * | 12/2023 | ........... | H04B 7/0456 |
| KR | 10-2038471 B1 | | 11/2019 | | |
| WO | 2017/096543 A1 | | 6/2017 | | |

* cited by examiner

AERIAL REPEATER POSITION DETERMINATION APPARATUS, AERIAL REPEATER POSITION DETERMINATION METHOD, AND RECORDING MEDIUM STORING INSTRUCTIONS TO PERFORM AERIAL REPEATER POSITION DETERMINATION METHOD

CROSS-REFERENCE TO RELATED APPLICATION

This application claims priority to Korean Patent Application No. 10-2022-0010043 filed on Jan. 24, 2022, the entire contents of which are incorporated herein by reference.

BACKGROUND

Technical Field

The present disclosure relates to an aerial repeater position determination device and method in an air backhaul system.

This work was supported by the Agency for Defense Development by the Korean Government.

Description of Related Technology

In 4G and 5G mobile communications of the related art, a mobile communication base station is installed in a base station tower to provide a mobile communication service to users, and the mobile communication service is provided to mobile terminals. Here, the mobile communication base station is connected to a source node through a wired network so that the mobile communication base station is connected to a communication service network.

SUMMARY

A problem to be solved by the present disclosure is to provide a device for determining a position of an aerial repeater at an optimal position at which an LoS is satisfied for both a source node and a mobile communication base station.

However, the problem to be solved by the present disclosure is not limited to those mentioned above, and another problem to be solved that is not mentioned can be clearly understood by those skilled in the art from the description below.

In accordance with an aspect of the present disclosure, there is provided an aerial repeater position determination apparatus. The apparatus comprises a transceiver unit configured to acquire a height of an aerial repeater, a position of a source node, and a position of a mobile communication base station; and an initial position determination unit configured to determine an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater.

The position at which the SNR of the signal received by the mobile communication base station is maximized may be located on a third straight line connecting a first point at which a first straight line perpendicular to the first plane and extending from the source node intersects the first plane, to a second point at which a second straight line perpendicular to the first plane and extending from the mobile communication base station intersects the first plane.

When assuming that the source node is located at an origin of a three-dimensional space coordinate system having values of a x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, the initial position determination unit is configured to: calculating a value of a x-axis of the initial position of the aerial repeater and a value of a y-axis of the initial position of the aerial repeater by calculating an equation 1 and 2 as follows, and determine the initial position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \langle \text{Equation 1} \rangle$$

$$y = \varepsilon \cdot w_2, \qquad \langle \text{Equation 2} \rangle$$

herein the $\varepsilon$ is calculated by an equation 3 as follows, $$\varepsilon = \frac{1}{2} + 2\sqrt{-\frac{a}{3}} \cos\left(\frac{1}{3}\cos^{-1}\left(\frac{3b}{2a}\sqrt{-\frac{3}{a}}\right) - \frac{4\pi}{3}\right), \qquad \langle \text{Equation 3} \rangle$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_2^2 + w_2^2}\right) - \frac{1}{4}, \text{ and} \qquad \langle \text{Equation 4} \rangle$$

$$b = \frac{1}{4}\left(\frac{H^2}{w_2^2 + w_2^2} - \frac{(H-h)^2}{w_2^2 + w_2^2}\right). \qquad \langle \text{Equation 5} \rangle$$

The transceiver unit is further configured to acquire terrain feature information between the determined initial position of the aerial repeater and the position of the mobile communication base station.

The aerial repeater position determination device further may include an LoS determination unit configured to determine whether a line of sight (LoS) between the aerial repeater located at the initial position and the mobile communication base station is satisfied, on the basis of the acquired terrain feature information, the position of the mobile communication base station, and the determined initial position of the aerial repeater; and a final position determination unit configured to search for a candidate position at which an LoS between a first candidate position randomly selected inside a first sphere having a first predetermined radius centered on the determined initial position of the aerial repeater and the mobile communication base station is satisfied and determine a final position of the aerial repeater on the basis of the candidate position that has been searched for when the LoS between the aerial repeater located at the initial position and the mobile communication base station is not satisfied, and determine the initial position of the aerial repeater as the final position when the LoS between the aerial repeater located at the initial position and the mobile communication base station is satisfied.

The final position determination unit may determine the position at which the SNR of the signal received by the mobile communication base station is maximized among candidate positions at which the LoS is satisfied, as a final position of the aerial repeater.

The LoS determination unit is configured to determine whether or not there is a position at which the LoS between the first candidate position and the mobile communication base station is satisfied.

The final position determination unit is configured to: re-search for a second candidate position randomly selected inside a second sphere having a second radius larger than the first radius centered on the determined initial position of the aerial repeater, and a position at which an LoS between the aerial repeater and the mobile communication base station is satisfied when there is no position at which an LoS between the first candidate position and the mobile communication base station is satisfied, and determine the final position of the aerial repeater again on the basis of a candidate position at which the LoS between the aerial repeater and the mobile communication base station is satisfied, the candidate position being determined by the re-search.

The second candidate position is located inside the second sphere and outside the first sphere.

In accordance with another aspect of the present disclosure, there is provided an aerial repeater position determination method. The method comprises: acquiring a height of the aerial repeater, a position of a source node, and a position of a mobile communication base station; and determining an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater.

The position at which the SNR of the signal received by the mobile communication base station is maximized is located on a third straight line connecting a first point at which a first straight line perpendicular to the first plane and extending from the source node intersects the first plane, to a second point at which a second straight line perpendicular to the first plane and extending from the mobile communication base station intersects the first plane.

When assuming that the source node is located at an origin of a three-dimensional space coordinate system having values of a x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, the determining the initial position may include: calculating a value of a x-axis of the initial position of the aerial repeater and a value of a y-axis of the initial position of the aerial repeater by calculating an equation 1 and 2 as follows, and determine the position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \text{(Equation 1)}$$

$$y = \varepsilon \cdot w_2, \qquad \text{(Equation 2)}$$

herein the $\varepsilon$ is calculated by an equation 3 as follows, $$\varepsilon = \frac{1}{2} + 2\sqrt{-\frac{a}{3}}\cos\left(\frac{1}{3}\cos^{-1}\left(\frac{3b}{2a}\sqrt{-\frac{3}{a}}\right) - \frac{4\pi}{3}\right), \qquad \text{(Equation 3)}$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_1^2 + w_2^2}\right) - \frac{1}{4}, \text{ and} \qquad \text{(Equation 4)}$$

$$b = \frac{1}{4}\left(\frac{H^2}{w_1^2 + w_2^2} - \frac{(H-h)^2}{w_1^2 + w_2^2}\right). \qquad \text{(Equation 5)}$$

The aerial repeater position determination apparatus may further comprise: acquiring terrain feature information between the determined initial position of the aerial repeater and the position of the mobile communication base station; determining whether a line of sight (LoS) between the aerial repeater located at the initial position and the mobile communication base station is satisfied, on the basis of the acquired terrain feature information, the position of the mobile communication base station, and the determined initial position of the aerial repeater; searching for a candidate position at which an LoS between a first candidate position randomly selected inside a first sphere having a first predetermined radius centered on the determined initial position of the aerial repeater and the mobile communication base station is satisfied and determine a final position of the aerial repeater on the basis of the candidate position that has been searched for when the LoS between the aerial repeater located at the initial position and the mobile communication base station is not satisfied; and determining the initial position of the aerial repeater as the final position when the LoS between the aerial repeater located at the initial position and the mobile communication base station is satisfied.

The determining the final position of the aerial repeater may include determining the position at which the SNR of the signal received by the mobile communication base station is maximized among candidate positions at which the LoS is satisfied, as a final position of the aerial repeater.

The aerial repeater position determination apparatus may further comprise: determining whether or not there is a position at which the LoS between the first candidate position and the mobile communication base station is satisfied; re-searching for a second candidate position randomly selected inside a second sphere having a second radius larger than a first radius centered on the determined initial position of the aerial repeater, and a position at which an LoS between the aerial repeater and the mobile communication base station is satisfied when there is no position at which an LoS between the first candidate position and the mobile communication base station is satisfied; and determining the final position of the aerial repeater again on the basis of a candidate position at which the LoS between the aerial repeater and the mobile communication base station is satisfied, the candidate position being determined by the re-search.

The second candidate position is located inside the second sphere and outside the first sphere.

In accordance with another aspect of the present disclosure, there is provided a non-transitory computer-readable recording medium storing a computer program, which comprises instructions for a processor to perform an aerial repeater position determination method. The terminal control method comprises: acquiring a height of the aerial repeater, a position of a source node, and a position of a mobile communication base station; and determining an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater.

The position at which the SNR of the signal received by the mobile communication base station is maximized is located on a third straight line connecting a first point at which a first straight line perpendicular to the first plane and extending from the source node intersects the first plane, to a second point at which a second straight line perpendicular to the first plane and extending from the mobile communication base station intersects the first plane.

When assuming that the source node is located at an origin of a three-dimensional space coordinate system having values of a x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, the determining the initial position includes: calculating a value of a x-axis of the initial position of the aerial repeater and a value of a y-axis of the initial position of the aerial repeater by calculating an equation 1 and 2 as follows, and determine the 3D position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \langle \text{Equation 1} \rangle$$

$$y = \varepsilon \cdot w_2, \qquad \langle \text{Equation 2} \rangle$$

herein the $\varepsilon$ is calculated by an equation 3 as follows, $$\varepsilon = \frac{1}{2} + 2\sqrt{-\frac{a}{3}} \cos\left(\frac{1}{3}\cos^{-1}\left(\frac{3b}{2a}\sqrt{-\frac{3}{a}}\right) - \frac{4\pi}{3}\right), \qquad \langle \text{Equation 3} \rangle$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_1^2 + w_2^2}\right) - \frac{1}{4}, \text{ and} \qquad \langle \text{Equation 4} \rangle$$

-continued $$b = \frac{1}{4}\left(\frac{H^2}{w_2^2 + w_2^2} - \frac{(H-h)^2}{w_2^2 + w_2^2}\right). \qquad \langle \text{Equation 5} \rangle$$

The aerial repeater position determination method may further comprise: acquiring terrain feature information between the determined initial position of the aerial repeater and the position of the mobile communication base station; determining whether a line of sight (LoS) between the aerial repeater located at the initial position and the mobile communication base station is satisfied, on the basis of the acquired terrain feature information, the position of the mobile communication base station, and the determined initial position of the aerial repeater; searching for a candidate position at which an LoS between a first candidate position randomly selected inside a first sphere having a first predetermined radius centered on the determined initial position of the aerial repeater and the mobile communication base station is satisfied and determine a final position of the aerial repeater on the basis of the candidate position that has been searched for when the LoS between the aerial repeater located at the initial position and the mobile communication base station is not satisfied; and determining the initial position of the aerial repeater as the final position when the LoS between the aerial repeater located at the initial position and the mobile communication base station is satisfied.

The determining the final position of the aerial repeater may include determining the position at which the SNR of the signal received by the mobile communication base station is maximized among candidate positions at which the LoS is satisfied, as a final position of the aerial repeater.

The aerial repeater position determination method may further include: determining whether or not there is a position at which the LoS between the first candidate position and the mobile communication base station is satisfied; re-searching for a second candidate position randomly selected inside a second sphere having a second radius larger than the first radius centered on the determined initial position of the aerial repeater, and a position at which an LoS between the aerial repeater and the mobile communication base station is satisfied when there is no position at which an LoS between the first candidate position and the mobile communication base station is satisfied; and determining the final position of the aerial repeater again on the basis of a candidate position at which the LoS between the aerial repeater and the mobile communication base station is satisfied, the candidate position being determined by the re-search.

According to an embodiment of the present disclosure, when an LoS is not formed between a source node and a mobile communication base station mounted on an unmanned air vehicle due to shielding by an obstacle, a backbone link can be stably provided to a mobile terminal in a system using an aerial repeater. Further, efficient communication between the source node and the mobile terminal can be performed by providing an optimal position of the aerial repeater in the system using the aerial repeater.

DETAILED DESCRIPTION

Figure 1:
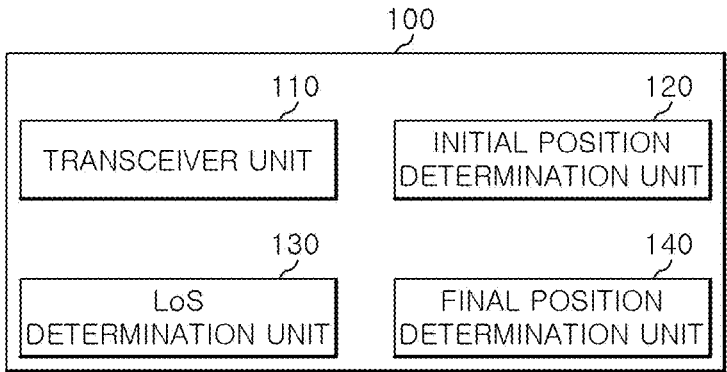
FIG. 1 is a block diagram illustrating an aerial repeater position determination device according to an embodiment of the present disclosure.

A method of mounting a mobile communication base station on an aerial unmanned air vehicle instead of installing the mobile communication base station in a ground tower to provide a mobile communication service to mobile phones of individuals located on the ground is being developed. In this case, a backbone connected to a source node should be wirelessly connected via a source node on the ground in order for the mobile communication base station mounted on the aerial unmanned air vehicle to be connected to a service network of a communication service provider and provide the mobile communication service to mobile terminals.

When shielding is caused by a terrain feature between a source node located on the ground and a mobile communication base station mounted on an aerial unmanned air vehicle, a backbone link connected to the mobile communication base station through the source node does not satisfy a line of sight (LoS), and thus, the mobile communication base station cannot provide a mobile communication service to a mobile terminal of an individual. In this case, another unmanned air vehicle and another aerial repeater should be disposed at positions at which the LoS is satisfied for both the source node and the mobile communication base station, and a backbone link connected to the source node on the ground should be satisfied in two hops from the source node to the mobile communication base station via the aerial repeater in order for the mobile communication base station to provide a mobile communication service to the mobile terminal.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
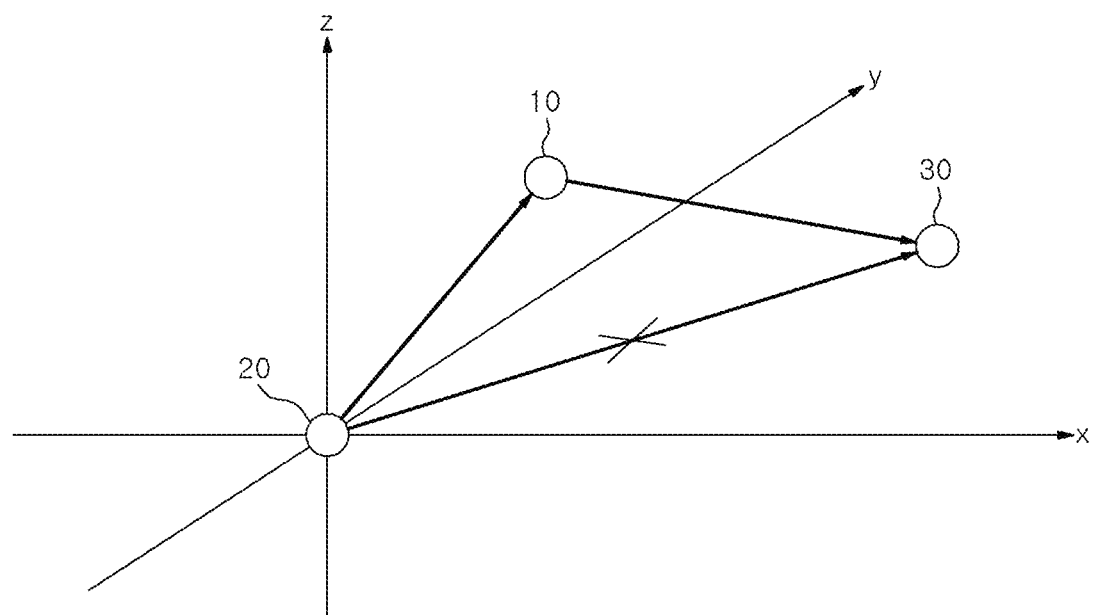
FIG. 2 illustrates a backbone link created from a source node to a mobile communication base station using an aerial repeater.

FIG. 1 is a block diagram illustrating an aerial repeater position determination device according to an embodiment of the present disclosure, and FIG. 2 illustrates a backbone link created from a source node to a mobile communication base station using an aerial repeater.

Referring to FIGS. 1 and 2, an aerial repeater position determination device 100 may include a transceiver unit (or a transceiver) 110, an initial position determination unit (or an initial position determination processor) 120, an LoS determination unit (or an LoS determination processor) 130, and a final position determination unit (or a final position determination processor) 140.

When a backbone link connected to a source node 20 is provided to a mobile communication base station 30, a line of sight (LoS) may be assumed to be not satisfied from the source node 20 to the mobile communication base station 30 mounted on an aerial unmanned air vehicle due to by a terrain feature and other obstacles. In this case, the backbone link connected to the source node with two hops from the source node 20 to the mobile communication base station 30 via the aerial repeater 10 using the aerial repeater 10 mounted on another aerial unmanned air vehicle may be provided to a mobile terminal of a user through the mobile communication base station 30.

Here, the aerial repeater position determination device 100 may determine an optimal position of the aerial repeater 10 at which an SNR of a signal received by the mobile communication base station 30 is maximized. Further, the aerial repeater position determination device 100 may determine the position of the aerial repeater 10 at which an LoS between the aerial repeater 10 and the mobile communication base station 30 is satisfied.

Since an intensity of the signal received by the mobile communication base station 30 increases as a distance decreases, a magnitude of the SNR of the signal received by the mobile communication base station 30 increases as a distance of two hops decreases. Therefore, the aerial repeater position determination device 100 can determine the position of the aerial repeater 10 so that the distance of the two hops becomes the shortest distance.

To this end, the transceiver unit 110 obtains position information including 3D coordinates of the source node 20, position information including 3D coordinates of the mobile communication base station 30, and height information of the aerial repeater 10. Here, the position information of the source node 20 and the mobile communication base station 30 and the height information of the aerial repeater 10 acquired by the transceiver unit 110 may be acquired from other devices, and may be acquired from at least one of the source node 20, the mobile communication base station 30, and the aerial repeater 10. A method by which the transceiver unit 110 acquires the position information of the source node 20 and the mobile communication base station 30 and the height information of the aerial repeater 10 is not limited thereto.

Figure 3:
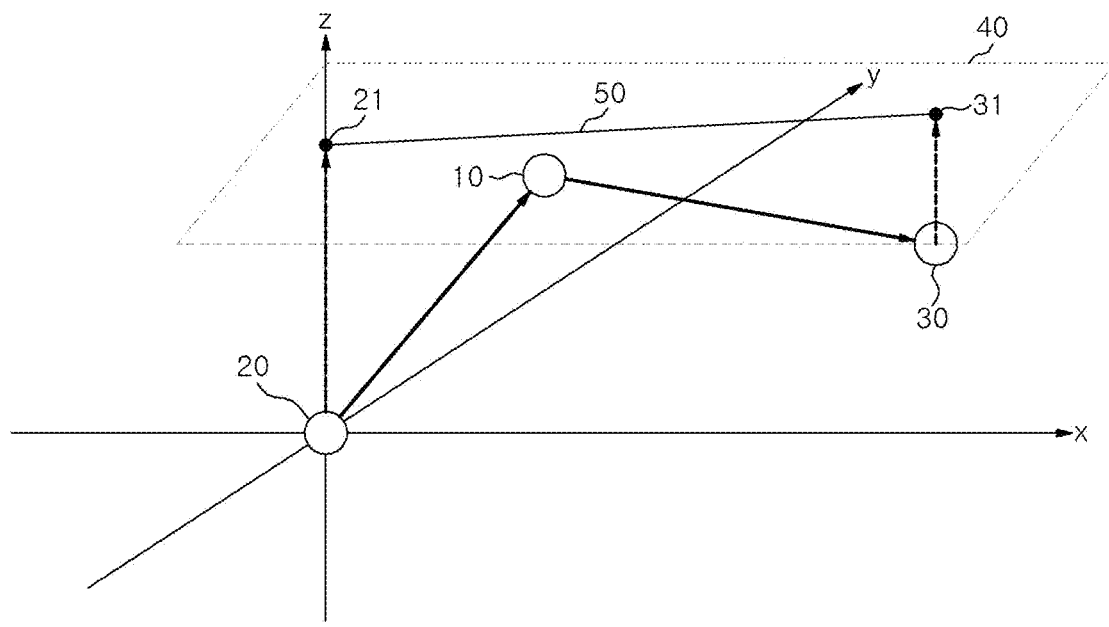
FIG. 3 illustrates a method of determining an optimal position of an aerial repeater according to an embodiment of the present disclosure.

FIG. 3 illustrates a method of determining an optimal position of an aerial repeater according to an embodiment of the present disclosure.

The initial position determination unit 120 may determine the position of the aerial repeater 10 on a first plane 40 that is parallel to the ground and includes the aerial repeater 10, on the basis of the position of the source node 20, the position of the mobile communication base station 30, and the height of the aerial repeater 10. Further, the initial position determination unit 120 may determine the position of the aerial repeater 10 at which a signal to noise ratio (SNR) of the signal received by the mobile communication base station is maximized on the first plane 40.

The initial position of the aerial repeater 10 may be determined so that the position at which the SNR of the signal received by the mobile communication base station 30 is maximized, which is determined by the initial position determination unit 120, is located on a third straight line 50 connecting a first point 21 at which a first straight line perpendicular to the first plane 40 and extending from the source node 20 intersects the first plane 40, to a second point 31 at which a second straight line perpendicular to the first plane 40 and extending from the mobile communication base station 30 intersects the first plane 40.

According to the embodiment, the initial position determination unit 120 may use the position information of the source node 20 and the mobile communication base station 30 acquired by the transceiver unit 110 to dispose the source node 20 and the mobile communication base station 30 in a spatial coordinate system consisting of (x, y, z), and may determine the position of the aerial repeater 10 at which the SNR of the signal received by the mobile communication base station is maximized.

In greater detail, first, the initial position determination unit 120 may dispose the source node 20 at an origin (0, 0, 0) on the spatial coordinate system, for convenience of calculation. Further, the initial position determination unit 120 may calculate a relative position of the mobile communication base station 30 with respect to the source node 20 on the basis of the position information of the source node 20 and the position information of the mobile communication base station 30, and dispose the mobile communication base station 30 at the calculated position of the spatial coordinate system. Further, the initial position determination unit 120 may calculate a relative height of the aerial repeater 10 on the basis of the acquired positions of the source node 20 and the mobile communication base station 30 and the height of the aerial repeater 10, and dispose the aerial repeater 10 at the calculated height in the spatial coordinate system.

When coordinates at which the mobile communication base station 30 is disposed in the spatial coordinate system are (w1, w2, h), and a z coordinate of the first plane 40 including the aerial repeater 10 disposed in the spatial coordinate system is H, the initial position determination unit 120 may calculate coordinates of the first point 21 as first coordinates (0, 0, H) and coordinates of the second point 31 to second coordinates (w1, w2, H). Further, the initial position determination unit 120 may generate the third straight line 50 connecting the first point 21 to the second point 31. Subsequently, the initial position determination unit 120 may determine the initial position of the aerial repeater 10 on the generated third straight line 50 on the first plane 40.

When the aerial repeater 10 assumes that plane coordinates (x, y) on the first plane 40 to be determined by the initial position determination unit 120 are (q1, q2), the initial position unit 120 may calculate q1 and q2 as shown in Equation 1 below.

$$\begin{pmatrix} q_1 \\ q_2 \end{pmatrix} = \varepsilon \begin{pmatrix} w_1 \\ w_2 \end{pmatrix} \qquad \text{[Equation 1]}$$

Here, $\varepsilon$ is a coefficient for determining a specific position on the straight line. Subsequently, the initial position determination unit 120 may calculate $\varepsilon$ in which an SNR of a reception signal received by the mobile communication base station 30 is maximized, as shown in Equation 2 below.

$$\varepsilon = \frac{1}{2} + 2\sqrt{-\frac{a}{3}}\cos\left(\frac{1}{3}\cos^{-1}\left(\frac{3b}{2a}\sqrt{-\frac{3}{a}}\right) - \frac{4\pi}{3}\right) \qquad \text{[Equation 2]}$$

Here, the coefficient a is $$\frac{1}{2}\left(\frac{H^2}{w_1^2+w_2^2} + \frac{(H-h)^2}{w_1^2+w_2^2}\right) - \frac{1}{4},$$

and the coefficient b is $$\frac{1}{4}\left(\frac{H^2}{w_1^2+w_2^2} - \frac{(H-h)^2}{w_1^2+w_2^2}\right).$$

The coefficient $\varepsilon$ is a coefficient calculated on condition that a passive beamforming gain is maximized under a condition that a backhaul rate is equal to or higher than a throughput of a fronthaul link.

The aerial repeater position determination device 100 may determine an initial position (q1, q2, H) of the aerial repeater 10 in a spatial coordinate system, which is a position at which the SNR is maximized, using calculated coordinates (x, y) and a calculated z-coordinate H of the aerial repeater 10.

Meanwhile, the initial position of the aerial repeater 10 determined by the initial position determination unit 120 may be a position at which the LoS between the aerial repeater 10 and the mobile communication base station 30 is not satisfied. Therefore, the aerial repeater position determination device 100 may determine a final position of the aerial repeater 10 on the basis of the determined initial position in order to find a position at which the LoS between the aerial repeater 10 and the mobile communication base station 30 is satisfied.

Figure 4:
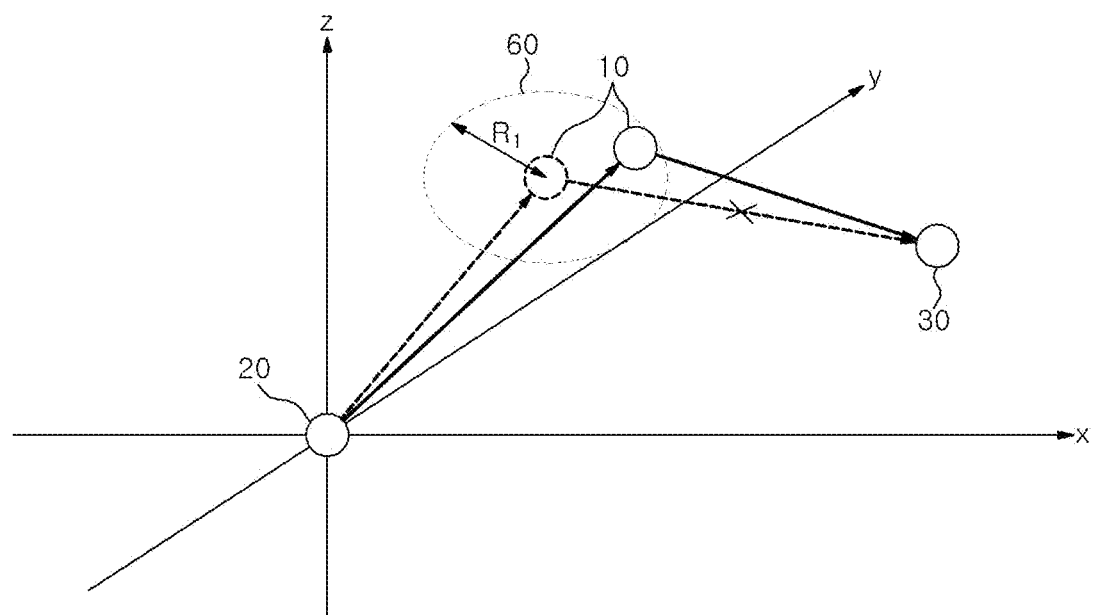
FIG. 4 illustrates a method of correcting a position of the aerial repeater to determine a position satisfying an LoS of the aerial repeater according to an embodiment of the present disclosure.

Referring back to FIG. 4, according to an embodiment, the transceiver unit 110 may acquire terrain feature information between the aerial repeater 10 and the mobile communication base station 30 at the determined initial position of the aerial repeater 10, and the LoS determination unit 130 may determine whether the LoS between the aerial repeater 10 located at the initial position and the mobile communication base station 30 is satisfied, on the basis of the acquired terrain feature information.

Here, the terrain feature information acquired by the transceiver unit 110 may include a map including terrain feature information that has been measured by a separate device or terrain feature information that has been measured in advance.

When the LoS between the aerial repeater 10 located at the initial position and the mobile communication base station 30 is satisfied, the final position determination unit 140 may determine the initial position of the aerial repeater 10 as the final position.

When the LoS between the aerial repeater 10 located at the initial position and the mobile communication base station 30 is not satisfied, the final position determination unit 140 may search for a candidate position at which an LoS between a first candidate position randomly selected inside a first sphere 60 having a radius $R_1$ centered on the initial position determined by the initial position determination unit 120 and the mobile communication base station 30 is satisfied. Subsequently, the final position determination unit 140 may determine the final position of the aerial repeater 10 on the basis of the candidate position that has been searched for.

When the LoS determination unit 130 determines that the LoS between the aerial repeater 10 and the mobile communication base station 30 is satisfied, the final position determination unit 140 may determine the initial position of the aerial repeater 10 determined by the initial position determination unit 120 as the final position.

Here, since there may be a plurality of positions at which the LoS between the aerial repeater 10 and the mobile communication base station 30 is satisfied inside the first sphere 60, the final position determination unit 140 may determine a position at which the SNR of the signal received by the mobile communication base station 30 is maximized among positions at which the LoS between the aerial repeater 10 and the mobile communication base station 30 is satisfied, as the final position of the aerial repeater 10.

The LoS determination unit 130 may determine that there is no position within the first sphere 60 at which the LoS between the aerial repeater 10 and the mobile communication base station 30 is satisfied. In this case, the aerial repeater position determination device 100 needs to additionally correct the final position of the aerial repeater 10 at which the LoS between the aerial repeater 10 and the mobile communication base station 30 is satisfied.

Figure 5:
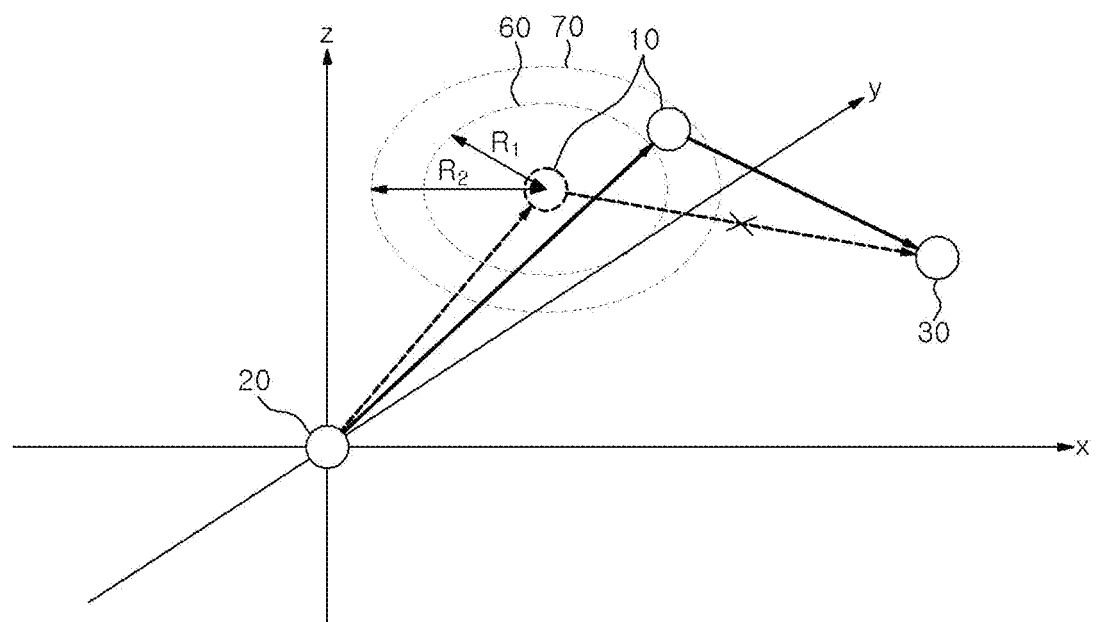
FIG. 5 illustrates a method of additionally correcting the position of the aerial repeater to determine a position satisfying the LoS of the aerial repeater according to an embodiment of the present disclosure.

FIG. 5 illustrates a method of additionally correcting the position of the aerial repeater to determine a position satisfying the LoS of the aerial repeater according to an embodiment of the present disclosure.

Referring to FIG. 5, the final position determination unit 140 generates a second sphere 70 having a second radius R2 larger than the first radius $R_1$ centered on the initial position (q1, q2, H) of the aerial repeater 10 determined by the initial position determination unit 120, and re-searches for a candidate position at which an LoS between a second candidate position randomly selected inside the generated second sphere 70 and the mobile communication base station 30 is satisfied. Subsequently, the final position determination unit 140 may determine the final position of the aerial repeater 10 from among the candidate positions, which have been re-searched for, at which the LoS between the aerial repeater 10 and the mobile communication base station 30 is satisfied.

According to an embodiment, the radius of the second sphere 70 generated by the final position determination unit 140 may be $2R_1$.

According to an embodiment, the candidate position re-searched for by the final position determination unit 140 may be located inside the second sphere 70 and outside the first sphere 60. That is, the final position determination unit 140 may not search for the position at which the LoS between the aerial repeater 10 and the mobile communication base station 30 is satisfied inside the first sphere 60 inside the generated second sphere 70. Thus, the final position determination unit 140 may re-search for candidate positions, except for the positions, at which the LoS is satisfied, that have already been searched, such that efficiency of calculation is improved.

Further, since there may be a plurality of positions at which the LoS between the aerial repeater 10 and the mobile communication base station 30 is satisfied inside the second sphere 70, the final position determination unit 140 determines the position at which the SNR of the signal received by the mobile communication base station 30 is maximized among positions at which the LoS between the aerial repeater 10 and the mobile communication base station 30 is satisfied inside the second sphere 70 as the final position of the aerial repeater 10.

In the above-described embodiments of the present disclosure, the transceiver unit 110, the initial position determination unit 120, the LoS determination unit 130, and the final position determination unit 140 may be implemented be hardware, firmware, software, or a combination thereof.

For example, the transceiver unit 110 may be implemented by a communication interface device capable of performing wireless communication using a 3G, 4G, 5G, 6G, or LTE network, and the initial position determination unit 120, the LoS determination unit 130, and the final position determination unit 140 may be implemented by an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, or the like.

In the case of implementation using firmware or software, the methods according to the embodiments of the present disclosure may be implemented in the form of a module, procedure, function, or the like that performs functions or operations described above. Software code may be stored in a memory unit and driven by a processor. The memory unit may be located inside or outside the processor and exchange data with the processor using various known means.

Figure 6:
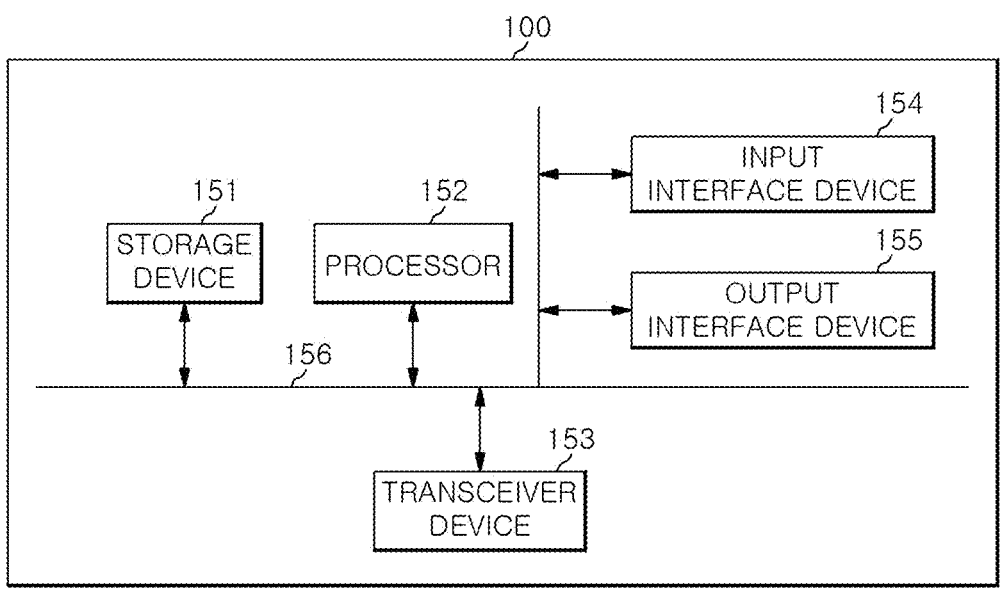
FIG. 6 is a block diagram illustrating the aerial repeater position determination device in terms of hardware.

FIG. 6 is a block diagram illustrating the aerial repeater position determination device in terms of hardware.

Referring to FIG. 6, the aerial repeater position determination device 100 includes a storage device 151 that stores at least one instruction, a processor 152 that executes the at least one instruction of the storage device 151, and a transceiver device 153, an input interface device 154, and an output interface device 155.

The respective components 151, 152, 153, 154, and 155 included in the aerial repeater position determination device 100 may be connected by a data bus 156 to communicate with each other.

The storage device 151 may include at least one of a memory, a volatile storage medium, and a non-volatile storage medium. For example, the storage device 151 may include at least one of a read only memory (ROM) and a random access memory (RAM).

The storage device 151 may further include at least one instruction to be executed by the processor 152 to be described below. The processor 152 may be a central processing unit (CPU), a graphics processing unit (GPU), a micro controller unit (MCU), or a dedicated processor on which methods according to embodiments of the present disclosure are performed.

As described above, the processor 152 performs functions of the initial position determination unit 120, the LoS determination unit 130, and the final position determination unit 140 according to at least one program instruction stored in the storage device 151, and each of these may be stored in the form of at least one module in the memory and executed by the processor.

The transceiver device 153 may receive or transmit data from or to an internal device or an external device connected through communication, and may perform functions of the transceiver unit 110. For example, the transceiver device 153 may receive the position of the source node 20, the position of the mobile communication base station 30, and the height information of the aerial repeater 10 acquired from at least one of the external device, the source node 20, and the mobile communication base station 30.

The input interface device 154 may receive at least one control signal or set value from the user. For example, the input interface device 154 may receive a user input including the radius $R_1$ of the first sphere 60.

The output interface device 155 may output and visualize at least one piece of information including the position of the aerial repeater 10 finally determined by an operation of the processor 152.

Thus, when the LoS is not formed between the source node 20 and the mobile communication base station 30 due to shielding by an obstacle, the aerial repeater position determination device 100 can stably provide a backbone link to a mobile terminal.

The aerial repeater position determination device 100 according to the embodiment of the present disclosure has been described above. Hereinafter, an aerial repeater position determination method that is executed by a processor operation in the aerial repeater position determination device according to another embodiment of the present disclosure will be described.

Figure 7:
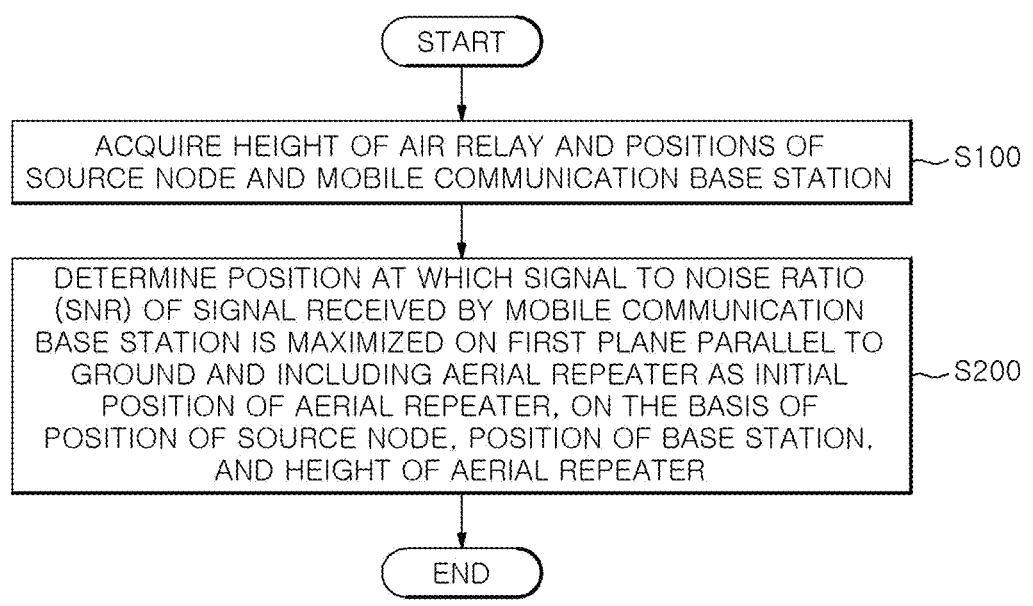
FIG. 7 is a flowchart of an aerial repeater position determination method according to an embodiment of the present disclosure.

FIG. 7 is a flowchart of an aerial repeater position determination method according to an embodiment of the present disclosure.

Referring further to FIGS. 2, 6, and 7, first, the transceiver device 153 may acquire a height of the air relay and positions of the source node and the mobile communication base station (S100).

Subsequently, the processor 152 may determine a position at which a signal to noise ratio (SNR) of a signal received by the mobile communication base station is maximized on a first plane parallel to the ground and including the aerial repeater as an initial position of the aerial repeater, on the basis of the position of the source node, the position of the base station, and the height of the aerial repeater (S200).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An aerial repeater position determination apparatus comprising:

a transceiver configured to acquire a height of an aerial repeater, a position of a source node, and a position of a mobile communication base station; and an initial position determination processor configured to determine an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater, wherein the position at which the SNR of the signal received by the mobile communication base station is maximized is located on a third straight line connecting a first point at which a first straight line perpendicular to the first plane and extending from the source node intersects the first plane, to a second point at which a second straight line perpendicular to the first plane and extending from the mobile communication base station intersects the first plane.

2. The aerial repeater position determination apparatus according to claim 1, wherein, when assuming that the source node is located at an origin of a three-dimensional spatial coordinate system having values of an x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, and wherein the initial position determination processor is configured to:

calculate a value of an x-axis of the initial position of the aerial repeater and a value of a y-axis of the initial position of the aerial repeater by calculating equations 1 and 2 as follows, and determine the initial position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \text{< Equation 1 >}$$

$$y = \varepsilon \cdot w_2, \qquad \text{< Equation 2 >}$$

herein the $\varepsilon$ is calculated by an equation 3 as follows, $$\varepsilon = \frac{1}{2} + 2\sqrt{-\frac{a}{3}}\cos\left(\frac{1}{3}\cos^{-1}\left(\frac{3b}{2a}\sqrt{-\frac{3}{a}}\right) - \frac{4\pi}{3}\right), \qquad \text{< Equation 3 >}$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_1^2 + w_2^2}\right) - \frac{1}{4}, \text{ and} \qquad \text{< Equation 4 >}$$

$$b = \frac{1}{4}\left(\frac{H^2}{w_1^2 + w_2^2} - \frac{(H-h)^2}{w_1^2 + w_2^2}\right). \qquad \text{< Equation 5 >}$$

3. The aerial repeater position determination apparatus according to claim 1, wherein the transceiver is further configured to acquire terrain feature information between the determined initial position of the aerial repeater and the position of the mobile communication base station, and wherein the aerial repeater position determination apparatus further includes:

an LoS determination processor configured to determine whether a line of sight (LoS) between the aerial repeater located at the initial position and the mobile communication base station is satisfied, on the basis of the acquired terrain feature information, the position of the mobile communication base station, and the determined initial position of the aerial repeater; and a final position determination processor configured to search for a candidate position at which an LoS between a first candidate position randomly selected inside a first sphere having a first predetermined radius centered on the determined initial position of the aerial repeater and the mobile communication base station is satisfied and determine a final position of the aerial repeater on the basis of the candidate position that has been searched for when the LoS between the aerial repeater located at the initial position and the mobile communication base station is not satisfied, and determine the initial position of the aerial repeater as the final position when the LoS between the aerial repeater located at the initial position and the mobile communication base station is satisfied.

4. The aerial repeater position determination apparatus according to claim 3, wherein the final position determination processor is configured to determine the position at which the SNR of the signal received by the mobile communication base station is maximized among candidate positions at which the LoS is satisfied, as a final position of the aerial repeater.

5. The aerial repeater position determination apparatus according to claim 3, wherein the LoS determination processor is configured to determine whether or not there is a position at which the LoS between the first candidate position and the mobile communication base station is satisfied, and wherein the final position determination processor is configured to:

re-search for a second candidate position randomly selected inside a second sphere having a second radius larger than the first radius centered on the determined initial position of the aerial repeater, and a position at which an LOS between the aerial repeater and the mobile communication base station is satisfied when there is no position at which an LoS between the first candidate position and the mobile communication base station is satisfied, and determine the final position of the aerial repeater again on the basis of a candidate position at which the LoS between the aerial repeater and the mobile communication base station is satisfied, the candidate position being determined by the re-search.

6. The aerial repeater position determination apparatus according to claim 5, wherein the second candidate position is located inside the second sphere and outside the first sphere.

7. An aerial repeater position determination method performed by an aerial repeater position determination apparatus, the aerial repeater position determination method comprising:

acquiring a height of the aerial repeater, a position of a source node, and a position of a mobile communication base station; and determining an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater, wherein the position at which the SNR of the signal received by the mobile communication base station is maximized is located on a third straight line connecting a first point at which a first straight line perpendicular to the first plane and extending from the source node intersects the first plane, to a second point at which a second straight line perpendicular to the first plane and extending from the mobile communication base station intersects the first plane.

8. The aerial repeater position determination method according to claim 7, wherein, when assuming that the source node is located at an origin of a three-dimensional spatial coordinate system having values of an x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, and wherein the determining the initial position includes:

calculating a value of a an x-axis of the initial position of the aerial repeater and a value of a y-axis of the initial position of the aerial repeater by calculating an equations 1 and 2 as follows, and determining the position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \langle\text{Equation 1}\rangle$$

$$y = \varepsilon \cdot w_2, \qquad \langle\text{Equation 2}\rangle$$

herein the $\varepsilon$ is calculated by an equation 3 as follows, $$\varepsilon = \frac{1}{2} + 2\sqrt{-\frac{a}{3}} \cos\left(\frac{1}{3}\cos^{-1}\left(\frac{3b}{2a}\sqrt{-\frac{3}{a}}\right) - \frac{4\pi}{3}\right), \qquad \langle\text{Equation 3}\rangle$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_1^2 + w_2^2}\right) - \frac{1}{4}, \text{ and} \qquad \langle\text{Equation 4}\rangle$$

$$b = \frac{1}{4}\left(\frac{H^2}{w_1^2 + w_2^2} - \frac{(H-h)^2}{w_1^2 + w_2^2}\right). \qquad \langle\text{Equation 5}\rangle$$

9. The aerial repeater position determination method according to claim 7, further comprising:

acquiring terrain feature information between the determined initial position of the aerial repeater and the position of the mobile communication base station;

determining whether a line of sight (LoS) between the aerial repeater located at the initial position and the mobile communication base station is satisfied, on the basis of the acquired terrain feature information, the position of the mobile communication base station, and the determined initial position of the aerial repeater;

searching for a candidate position at which an LOS between a first candidate position randomly selected inside a first sphere having a first predetermined radius centered on the determined initial position of the aerial repeater and the mobile communication base station is satisfied and determining a final position of the aerial repeater on the basis of the candidate position that has been searched for when the LoS between the aerial repeater located at the initial position and the mobile communication base station is not satisfied; and determining the initial position of the aerial repeater as the final position when the LoS between the aerial repeater located at the initial position and the mobile communication base station is satisfied.

10. The aerial repeater position determination method according to claim 9, wherein the determining the final position of the aerial repeater includes determining the position at which the SNR of the signal received by the mobile communication base station is maximized among candidate positions at which the LoS is satisfied, as a final position of the aerial repeater.

11. The aerial repeater position determination method according to claim 9, further comprising:

determining whether or not there is a position at which the LoS between the first candidate position and the mobile communication base station is satisfied;

re-searching for a second candidate position randomly selected inside a second sphere having a second radius larger than a first radius centered on the determined initial position of the aerial repeater, and a position at which an LOS between the aerial repeater and the mobile communication base station is satisfied when there is no position at which an LoS between the first candidate position and the mobile communication base station is satisfied; and determining the final position of the aerial repeater again on the basis of a candidate position at which the LoS between the aerial repeater and the mobile communication base station is satisfied, the candidate position being determined by the re-search.

12. The aerial repeater position determination method according to claim 11, wherein the second candidate position is located inside the second sphere and outside the first sphere.

13. A non-transitory computer-readable storage medium including computer executable instructions, wherein the instructions, when executed by a processor, cause the processor to perform an aerial repeater position determination method, the method comprising:

acquiring a height of the aerial repeater, a position of a source node, and a position of a mobile communication base station; and determining an initial position by checking a position at which a signal to noise ratio (SNR) of a signal received by the mobile communication base station is maximized on a first plane parallel to the ground and including the aerial repeater, on the basis of the position of the source node, the position of the mobile communication base station, and the height of the aerial repeater, wherein the position at which the SNR of the signal received by the mobile communication base station is maximized is located on a third straight line connecting a first point at which a first straight line perpendicular to the first plane and extending from the source node intersects the first plane, to a second point at which a second straight line perpendicular to the first plane and extending from the mobile communication base station intersects the first plane.

14. The non-transitory computer-readable storage medium according to claim 13, wherein, when assuming that the source node is located at an origin of a three-dimensional spatial coordinate system having values of an x-axis, a y-axis, and a z-axis, the mobile communication base station is located at a first coordinate having w1, w2, and h as values of the x-axis, the y-axis, and the z-axis of the spatial coordinate system on the basis of the acquired position of the source node and the acquired position of the mobile communication base station, and a value of the z-axis on the first plane in the spatial coordinate system calculated on the basis of the acquired position of the source node and the acquired height of the aerial repeater is H, and wherein the determining the initial position includes:

calculating a value of an x-axis of the initial position of the aerial repeater and a value of a y-axis of the initial position of the aerial repeater by calculating equations 1 and 2 as below, and determining the position of the aerial repeater having the calculated value of the x-axis of the initial position of the aerial repeater, the calculated value of the y-axis of the initial position of the aerial repeater, and the assumed value of the z-axis on the first plane, $$x = \varepsilon \cdot w_1, \qquad \langle \text{Equation 1} \rangle$$

$$y = \varepsilon \cdot w_2, \qquad \langle \text{Equation 2} \rangle$$

herein the $\varepsilon$ is calculated by an equation 3 as follows, $$\varepsilon = \frac{1}{2} + 2\sqrt{-\frac{a}{3}} \cos\left(\frac{1}{3}\cos^{-1}\left(\frac{3b}{2a}\sqrt{-\frac{3}{a}}\right) - \frac{4\pi}{3}\right), \qquad \langle \text{Equation 3} \rangle$$

herein the coefficient a is calculated by an equation 4 and the coefficient b is calculated by an equation 5 as follows, $$a = \frac{1}{2}\left(\frac{H^2}{w_1^2 + w_2^2} + \frac{(H-h)^2}{w_1^2 + w_2^2}\right) - \frac{1}{4}, \text{ and} \qquad \langle \text{Equation 4} \rangle$$

-continued $$b = \frac{1}{4}\left(\frac{H^2}{w_1^2 + w_2^2} - \frac{(H-h)^2}{w_1^2 + w_2^2}\right). \qquad \langle \text{Equation 5} \rangle$$

15. The non-transitory computer-readable storage medium according to claim 13, further comprising:

acquiring terrain feature information between the determined initial position of the aerial repeater and the position of the mobile communication base station;

determining whether a line of sight (LoS) between the aerial repeater located at the initial position and the mobile communication base station is satisfied, on the basis of the acquired terrain feature information, the position of the mobile communication base station, and the determined initial position of the aerial repeater;

searching for a candidate position at which an LOS between a first candidate position randomly selected inside a first sphere having a first predetermined radius centered on the determined initial position of the aerial repeater and the mobile communication base station is satisfied and determining a final position of the aerial repeater on the basis of the candidate position that has been searched for when the LoS between the aerial repeater located at the initial position and the mobile communication base station is not satisfied; and determining the initial position of the aerial repeater as the final position when the LoS between the aerial repeater located at the initial position and the mobile communication base station is satisfied.

16. The non-transitory computer-readable storage medium according to claim 15, wherein the determining the final position of the aerial repeater includes determining the position at which the SNR of the signal received by the mobile communication base station is maximized among candidate positions at which the LOS is satisfied, as a final position of the aerial repeater.

17. The non-transitory computer-readable storage medium according to claim 15, wherein aerial repeater position determination method further includes:

determining whether or not there is a position at which the LoS between the first candidate position and the mobile communication base station is satisfied;

re-searching for a second candidate position randomly selected inside a second sphere having a second radius larger than the first radius centered on the determined initial position of the aerial repeater, and a position at which an LoS between the aerial repeater and the mobile communication base station is satisfied when there is no position at which an LoS between the first candidate position and the mobile communication base station is satisfied; and determining the final position of the aerial repeater again on the basis of a candidate position at which the LoS between the aerial repeater and the mobile communication base station is satisfied, the candidate position being determined by the re-search.

* * * * *